(12) United States Patent
Cai et al.

(10) Patent No.: US 11,079,801 B2
(45) Date of Patent: Aug. 3, 2021

(54) ELECTRONIC DEVICE WITH LUMINOUS PATTERN

(71) Applicant: ASUSTEK COMPUTER INC., Taipei (TW)

(72) Inventors: Fu-Yu Cai, Taipei (TW); Ming-Chih Huang, Taipei (TW); Tong-Shen Hsiung, Taipei (TW); Meng-Chu Huang, Taipei (TW); Shang-Chih Liang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/592,212

(22) Filed: Oct. 3, 2019

(65) Prior Publication Data

US 2020/0375040 A1 Nov. 26, 2020

(30) Foreign Application Priority Data

May 21, 2019 (TW) ................................ 108117543

(51) Int. Cl.
| | |
|---|---|
| *G06F 1/16* | (2006.01) |
| *H05K 5/00* | (2006.01) |
| *G09F 13/08* | (2006.01) |
| *G09F 13/04* | (2006.01) |
| *H04M 1/22* | (2006.01) |
| *H04M 1/02* | (2006.01) |
| *G06F 1/18* | (2006.01) |

(52) U.S. Cl.
CPC ............ *G06F 1/1637* (2013.01); *G09F 13/04* (2013.01); *G09F 13/08* (2013.01); *H05K 5/0017* (2013.01); *G06F 1/1616* (2013.01); *G06F 1/1656* (2013.01); *G06F 1/181* (2013.01); *H04M 1/0283* (2013.01); *H04M 1/22* (2013.01)

(58) Field of Classification Search
CPC ...... G06F 1/1616; G06F 1/1637; G06F 1/181; H04M 1/22; H04M 1/0283; G09F 13/08; G09F 13/04; H05K 5/0017
See application file for complete search history.

(56) References Cited

U.S. PATENT DOCUMENTS

| | | | | |
|---|---|---|---|---|
| 2009/0116248 A1* | 5/2009 | Peng | ..................... | G06F 1/1656 |
| | | | | 362/351 |
| 2012/0050975 A1* | 3/2012 | Garelli | ..................... | H01Q 1/42 |
| | | | | 361/679.27 |
| 2014/0063784 A1* | 3/2014 | Muiter | ..................... | G09F 13/04 |
| | | | | 362/97.1 |

FOREIGN PATENT DOCUMENTS

| | | |
|---|---|---|
| CN | 104299831 B | 8/2010 |
| CN | 201563307 U | 8/2010 |
| TW | 200921337 A | 5/2009 |

OTHER PUBLICATIONS

Taiwanese Office Action based on corresponding Application No. 108117543, dated Dec. 31, 2019.

(Continued)

*Primary Examiner* — James Wu
(74) *Attorney, Agent, or Firm* — Muncy, Geissler, Olds and Lowe, P.C.

(57) ABSTRACT

An electronic device including a housing, a light source, and a printed pattern layer is provided. The housing includes an inner side and an outer side. The light source is disposed on the inner side of the housing. The printed pattern layer covers the outer side of the housing. The printed pattern layer includes a shielding area and a transparent area. A light beam from the light source transmits outward through the transparent area.

8 Claims, 9 Drawing Sheets

(56) References Cited

OTHER PUBLICATIONS

Press Release—GNN News; "ASUS new e-sports notebook TUF Gaming FX505 and FX705 debut—published by Gamescom in Germany is officially launched in Taiwan"; Taiwan, Oct. 15, 2018,—retrieved from https://gnn.gamer.com.tw/5/169635.html.
Press Release—Taipei News; "New ASUS TUF Gaming FX505 / 705 debut"; Taiwan,Oct. 15, 2018, 2018 Cologne Game Show (Gamescom), retrieved from https://www.asus.com/zentalk/tw/thread-364468-1-1.html.

* cited by examiner

United States Patent US 11,079,801 B2

ELECTRONIC DEVICE WITH LUMINOUS PATTERN

CROSS-REFERENCE TO RELATED APPLICATION

This application claims the priority benefit of Taiwan Application Serial No. 108117543, filed on May 21, 2019. The entirety of the above-mentioned patent application is hereby incorporated by reference herein and made a part of specification

BACKGROUND OF THE INVENTION

Field of the Invention

The disclosure relates to an electronic device.

Description of the Related Art

Luminous patterns are widely used on various electronic devices as recognition logos or decorations. Traditionally, a plastic material of a specific pattern is removed through mechanical processing on an injection-molded plastic housing to form a transparent area, and then an electroplated transparent decoration plates, such as a nameplate, is pasted to the transparent area to present a luminous pattern. However, in this manufacturing method, not only costs of metal stamping and nameplate electroplating are increased, but also a thickness of the housing is increased.

BRIEF SUMMARY OF THE INVENTION

The disclosure provides an electronic device. The electronic device includes a housing, a light source, and a printed pattern layer. The housing includes an inner side and an outer side. The light source is disposed on the inner side of the housing. The printed pattern layer covers the outer side of the housing. The printed pattern layer includes a shielding area and a transparent area. A light beam from the light source transmits outward through the transparent area.

Compared with a traditional technology, the electronic device provided in the disclosure covers the printed pattern layer on the housing directly to present a luminous pattern. In this way, costs of metal stamping and nameplate electroplating in a traditional manufacturing process are eliminated, and a thickness of the housing is reduced and a weight of the housing is reduced.

Specific embodiments used in the disclosure are further described through the following embodiments and drawings.

DETAILED DESCRIPTION OF THE EMBODIMENTS

Specific embodiments of the disclosure are described in more detail below with reference to schematic diagrams. Advantages and features of the disclosure will be clearer according to the following descriptions and claims. It is to be noted that all the drawings are in a very simple form and in an inaccurate proportion, and are merely intended to aid in illustrating a purpose of the embodiments of the disclosure conveniently and clearly.

Figure 1:
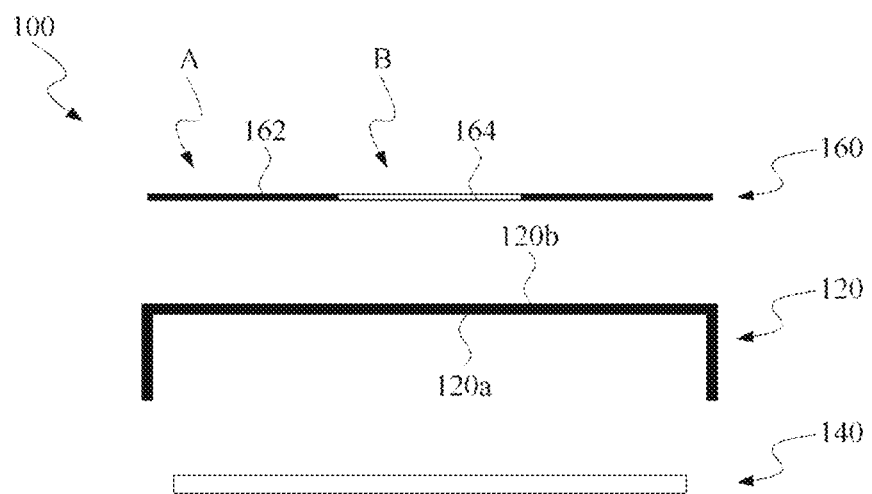
FIG. 1 is a schematic diagram of a first embodiment of an electronic device according to the disclosure.

FIG. 1 is a schematic diagram of a first embodiment of an electronic device according to the disclosure. As shown in the figure, an electronic device 100 includes a housing 120, a light source 140, and a printed pattern layer 160. The electronic device 100 is a plane display, a notebook computer, or other electronic devices including a light source therein.

The light source 140 is disposed on an inner side 120a of the housing 120, that is, located in an inner space defined by the housing 120. The printed pattern layer 160 covers an outer side 120b of the housing 120. The printed pattern layer 160 includes a shielding area A and a transparent area B. A light beam from the light source 140 transmits outward from the transparent area B. A shape of the transparent area B defines a shape of a luminous pattern of the electronic device 100.

In an embodiment, the above-mentioned housing 120 is a plastic housing. The plastic housing is made through injection molding or the like. In an embodiment, the above-mentioned printed pattern layer 160 is an in-mold rolling (IMR) pattern film. A pattern area 162 of the in-mold rolling pattern film corresponds to the above-mentioned shielding area A, and a blank area 164 of the in-mold rolling pattern film corresponds to the above-mentioned transparent area B.

Figure 2:
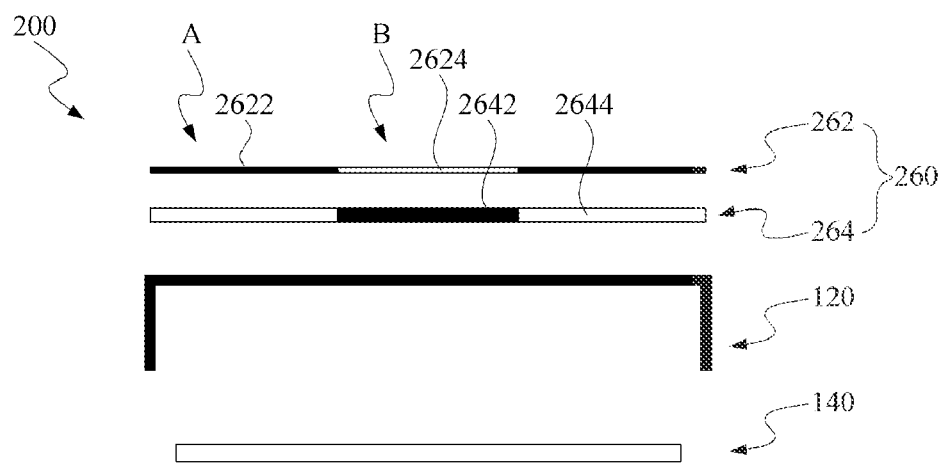
FIG. 2 is a schematic diagram of a second embodiment of an electronic device according to the disclosure.

FIG. 2 is a schematic diagram of a second embodiment of an electronic device 200 according to the disclosure. Compared with the embodiment of FIG. 1, a printed pattern layer 260 in this embodiment includes a first in-mold rolling pattern film 262 and a second in-mold rolling pattern film 264. The first in-mold rolling pattern film 262 includes a first pattern area 2622 and a first blank area 2624. The second in-mold rolling pattern film 264 includes a second pattern area 2642 and a second blank area 2644.

The first pattern area 2622 of the first in-mold rolling pattern film 262 corresponds to a shielding area A, and the second pattern area 2642 of the second in-mold rolling pattern film 264 corresponds to a transparent area B. In addition, the first pattern area 2622 of the first in-mold rolling pattern film 262 is a non-transparent pattern, and the second pattern area 2642 of the second in-mold rolling pattern film 264 is a transparent pattern.

In an embodiment, a color of the transparent area B presented through a light source is changed by a color of the second in-mold rolling pattern film 264. In other words, the transparent area B presents a color different from that of the housing 120 by the second in-mold rolling pattern film 264. In an embodiment, when the housing 120 is made of a colorless transparent material, the black first in-mold rolling pattern film 262 is covered on the housing 120 to define the shielding area A, and the red second in-mold rolling pattern film 264 is covered to define the transparent area B, so that the transparent area B presents red luminescence.

Figure 3:
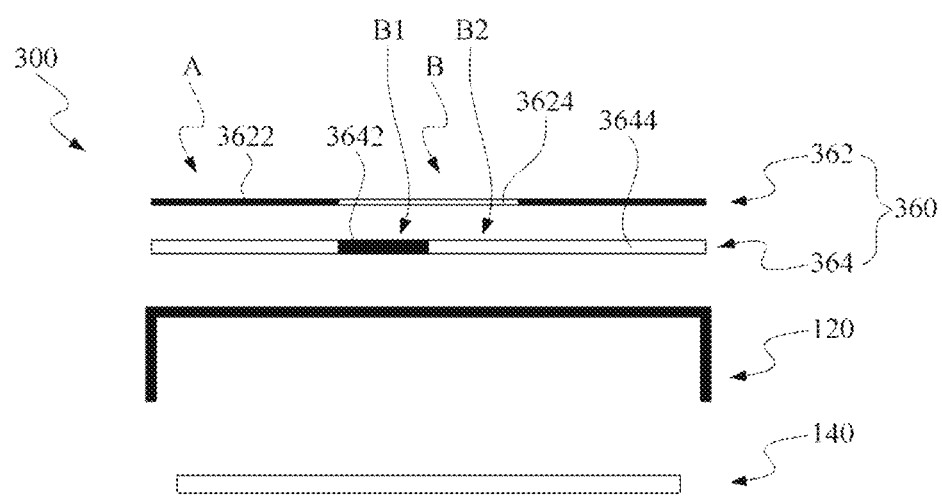
FIG. 3 is a schematic diagram of a third embodiment of an electronic device according to the disclosure.

FIG. 3 is a schematic diagram of a third embodiment of an electronic device 300 according to the disclosure. Compared with the embodiment of FIG. 2, a printed pattern layer 360 of this embodiment includes a first in-mold rolling pattern film 362 and a second in-mold rolling pattern film 364. The first in-mold rolling pattern film 362 includes a first pattern area 3622 and a first blank area 3624. The second in-mold rolling pattern film 364 includes a second pattern area 3642 and a second blank area 3644. The first pattern area 3622 of the first in-mold rolling pattern film 362 corresponds to a shielding area A, and the second pattern area 3642 of the second in-mold rolling pattern film 364 corresponds to a transparent area B and also corresponds to a position of the first blank area 3624 of the first in-mold rolling pattern film 362.

Figure 6A:
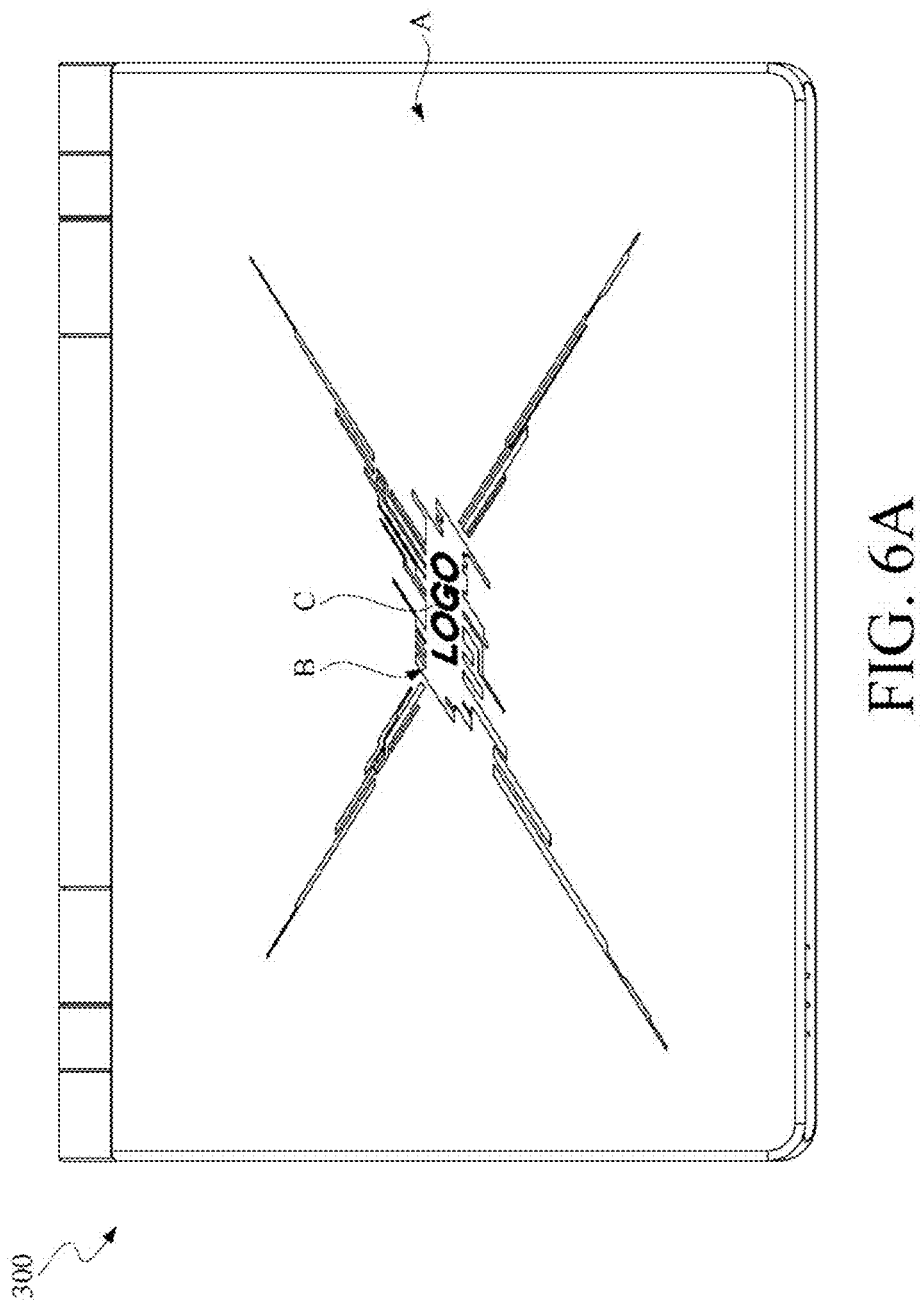
FIG. 6A to FIG. 6C show an embodiment of an illumination effect of an electronic device in FIG. 3.
Figure 6B:
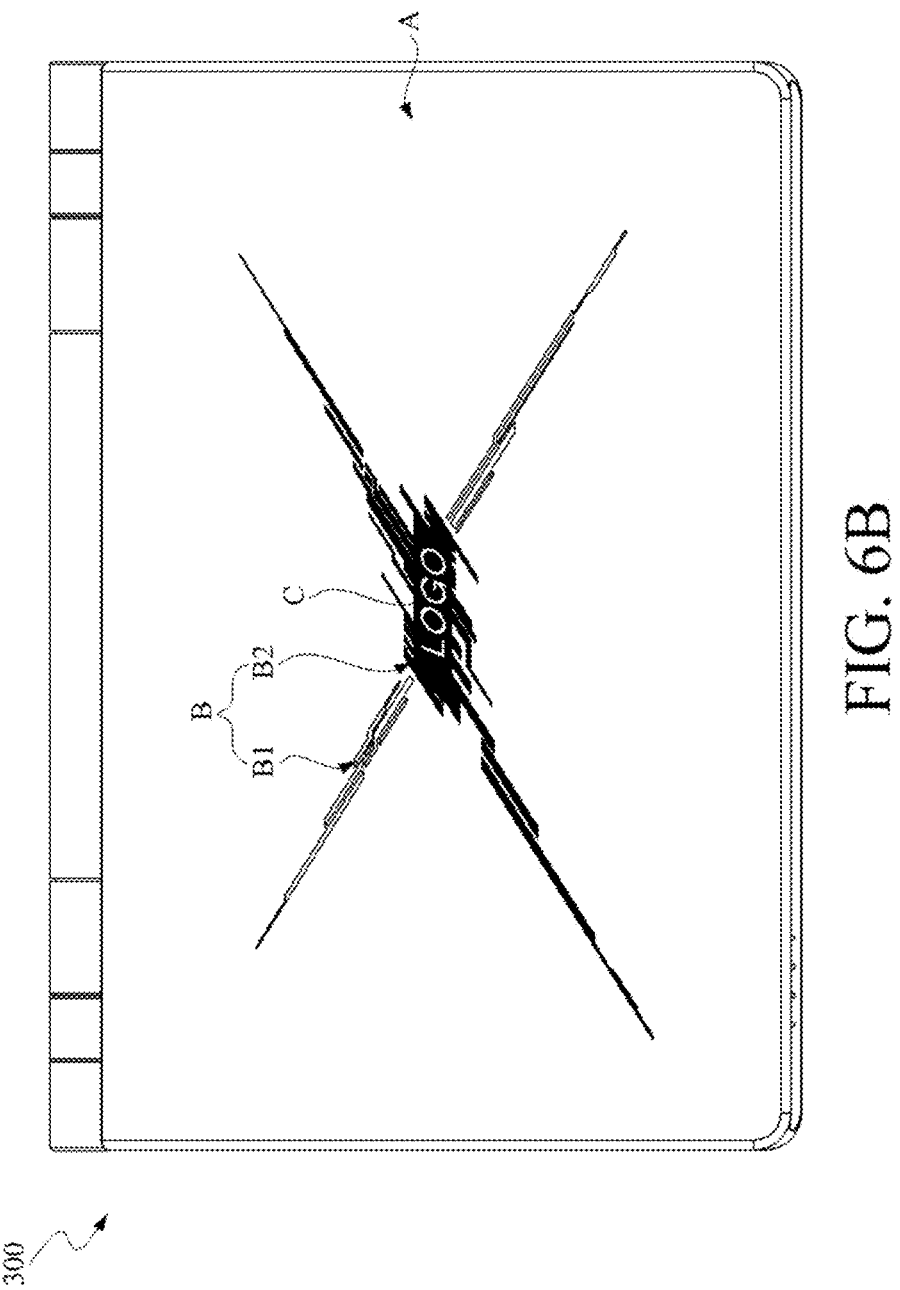
Figure 6C:
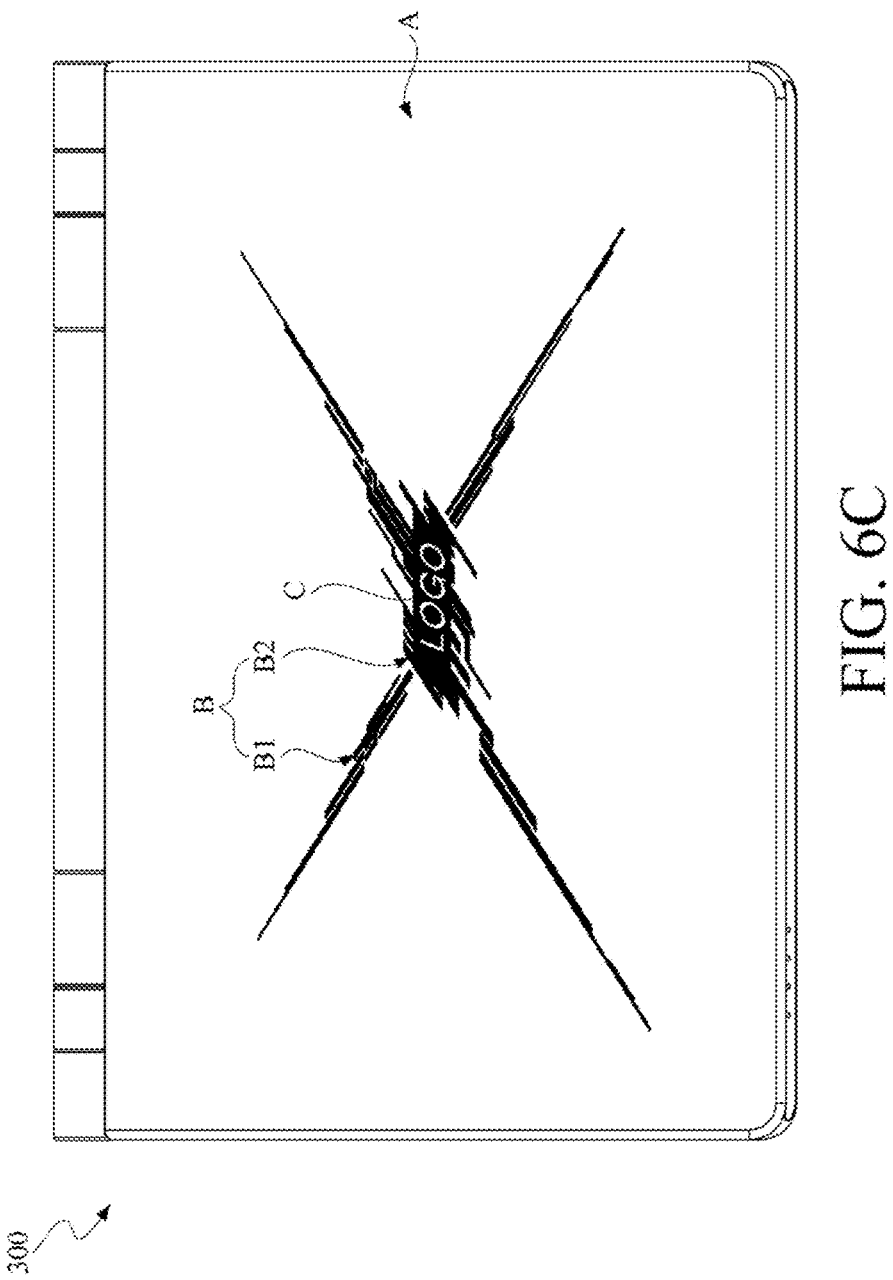

However, the second pattern area 3642 of the second in-mold rolling pattern film 364 of this embodiment covers only a portion of the transparent area B, and a low transparent portion B1 and a high transparent portion B2 are defined in the transparent area B to present a multi-level change. The low transparent portion B1 presents a distinct luminous pattern only when a brightness of a light source is relatively high or an external environment is relatively dim. When the brightness of the light source is relatively low or the external environment is relatively bright, only the high transparent portion B2, in the transparent area B, corresponding to the second blank area 3644 of the second in-mold rolling pattern film 364 presents a distinct luminous pattern. An illumination effect is shown in FIG. 6A to FIG. 6C.

Figure 4:
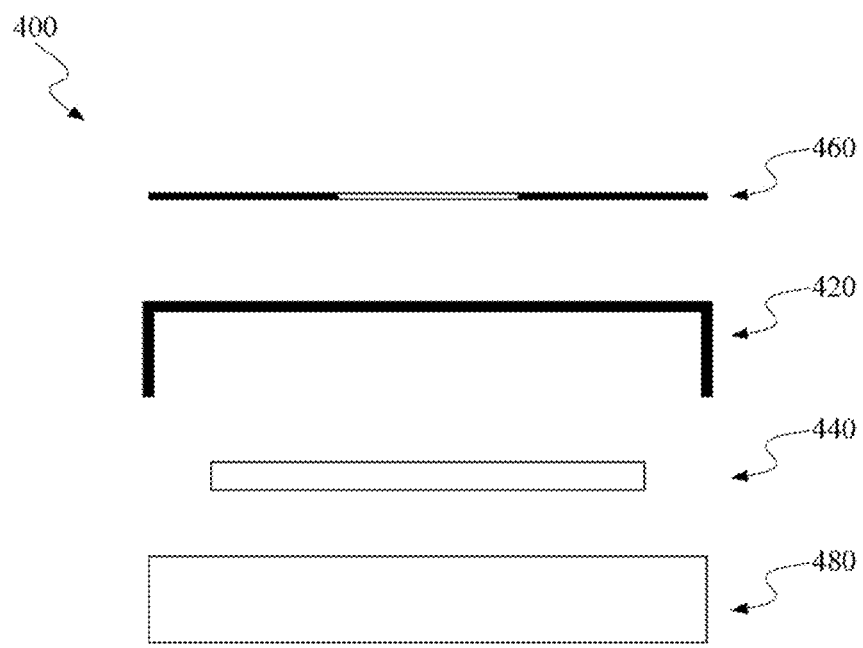
FIG. 4 is a schematic diagram of a fourth embodiment of an electronic device according to the disclosure.

FIG. 4 is a schematic diagram of a fourth embodiment of an electronic device 400 according to the disclosure. The electronic device 400 is a plane display, and a light source 440 located within a housing 420 is a backlight module of the plane display. As shown in the figure, the electronic device 400 includes a display panel 480, the display panel 480 and a printed pattern layer 460 located on opposite sides of the light source 440, that is, front and back sides of the plane display. A light beam transmits the light source simultaneously transmits to the display panel 480 and the printed pattern layer 460, to present a image on the display panel 480 and a luminous pattern on the housing.

Figure 5A:
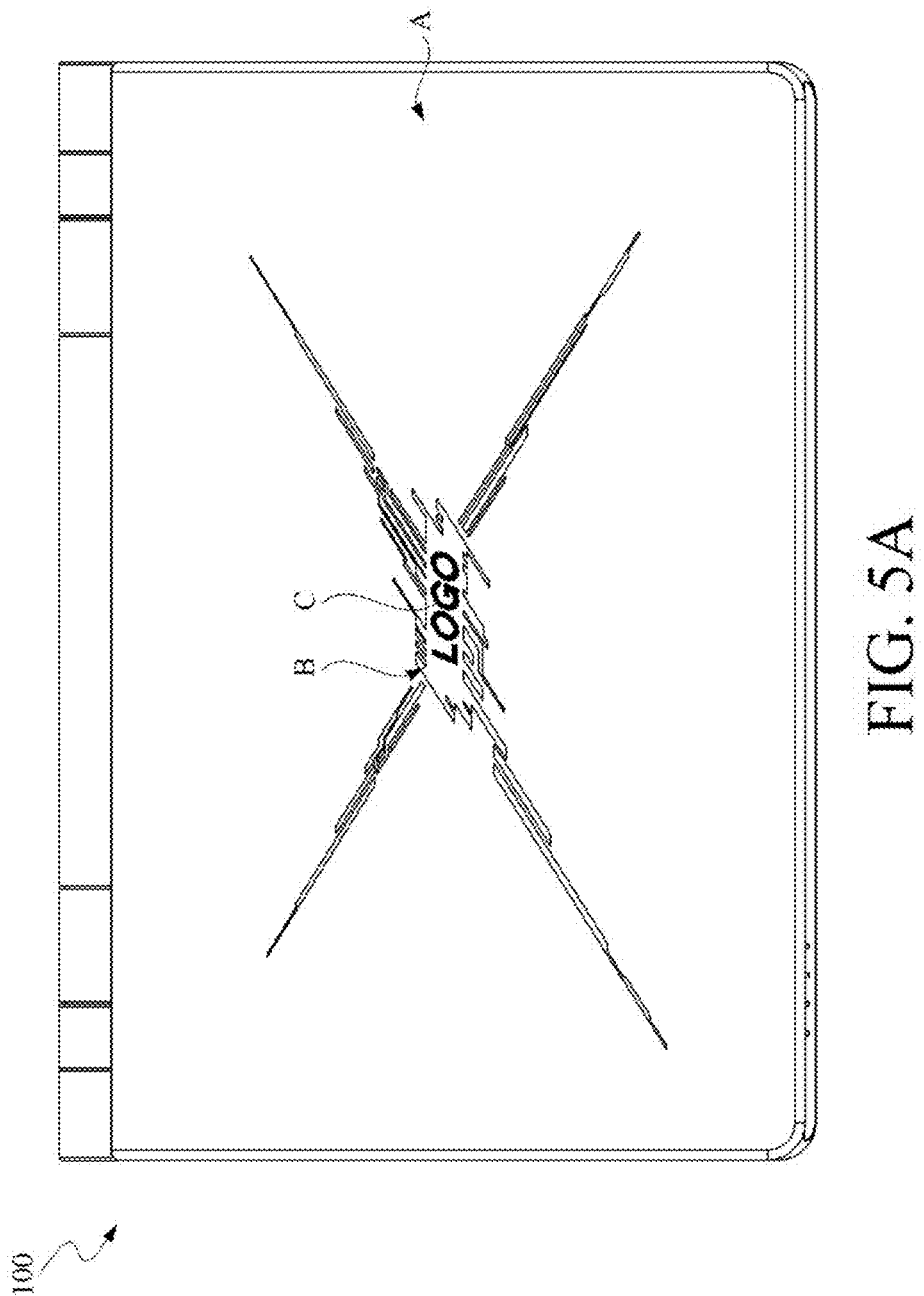
FIG. 5A and FIG. 5B show an embodiment of an illumination effect of an electronic device in FIG. 1.
Figure 5B:
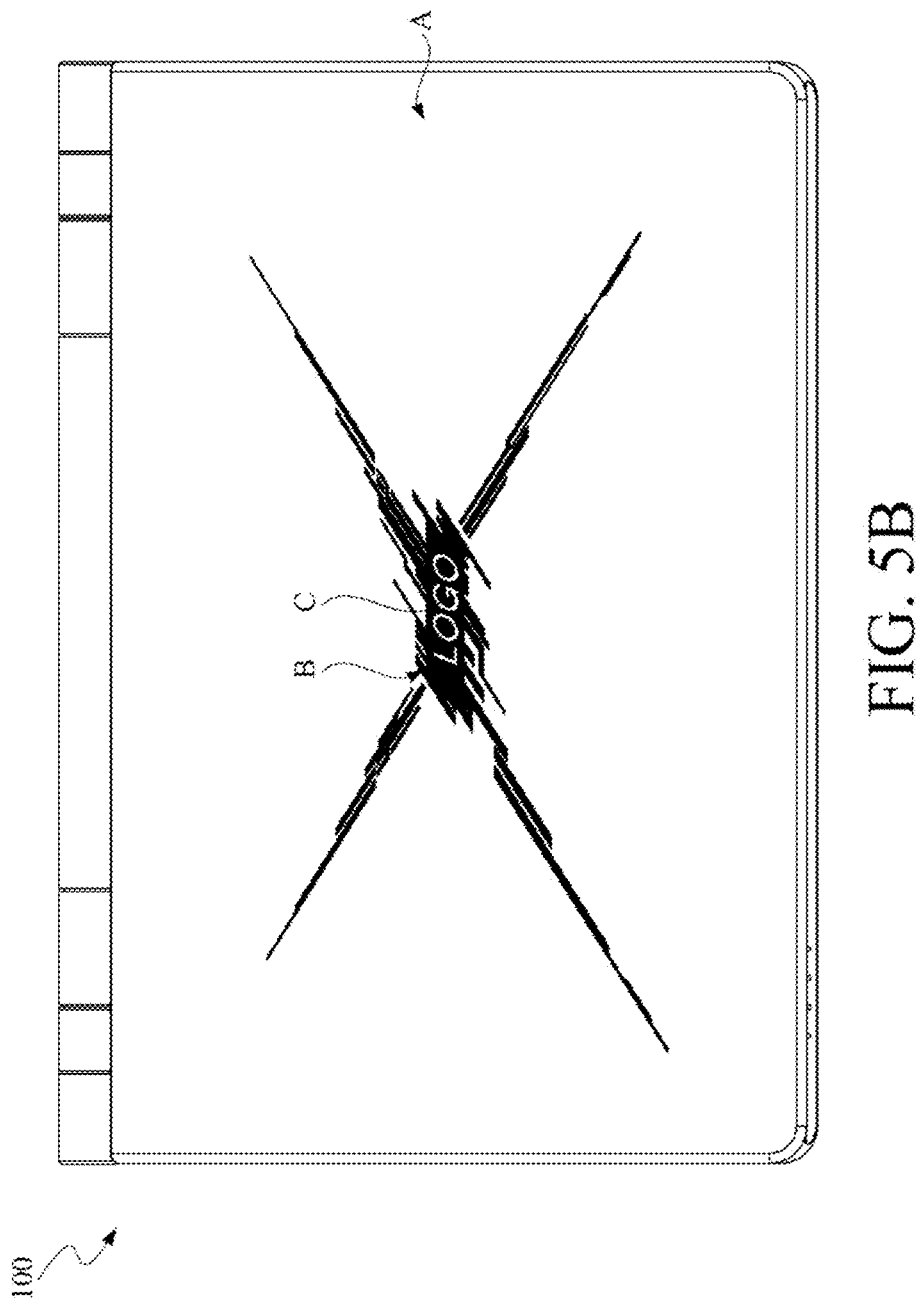

FIG. 5A and FIG. 5B show an embodiment of an illumination effect of the electronic device 100 in FIG. 1. A notebook computer is taken as an example in the figure. As shown in FIG. 5A, when the electronic device 100 is not enabled, an internal light source therein (that is, a backlight module of a screen portion) is not illuminated. At this time, the transparent area B is dim, and a visual effect thereof is similar to that of the shielding area A, to highlight a non-transparent nameplate C, such as a logo, located in the transparent area B. As shown in FIG. 5B, after the electronic device 100 is enabled, the internal light source therein is illuminated. A light beam from the light source transmits outward through the transparent area B to present a pattern of the transparent area B. At this time, the non-transparent nameplate C located in the transparent area B shields a part of the light beam to present an anti-black pattern, thereby highlighting an outline of the non-transparent nameplate C.

A color of the transparent area B depends on the housing 120 or the printed pattern layer 160. In an embodiment, when the housing 120 is red, and the blank area 164 of the printed pattern layer 160 is transparent and colorless, a red luminous pattern is presented. On the contrary, when the housing 120 is transparent and colorless, and the printed pattern layer 160 is red, a red luminous pattern is also presented.

FIG. 6A to FIG. 6C show an embodiment of an illumination effect of the electronic device 300 in FIG. 3. A notebook computer is used as an example in the figure. As shown in FIG. 5A, when the electronic device 300 is not enabled, an internal light source therein is not illuminated. A visual effect at this time is similar to that in FIG. 5A, and details are not described herein.

As shown in FIG. 6B, after the electronic device 300 is enabled, when in a bright environment, only the high transparent portion B2 in the transparent area B presents a luminous pattern, because a brightness of the external environment is relatively high. The low transparent portion B1 in the transparent area B presents a visual effect similar to that of the shielding area A.

As shown in FIG. 6C, after the electronic device 300 is enabled, when in a dim environment, a pattern of the entire transparent area B (including the high transparent portion B2 and the low transparent portion B1) is presented, because a brightness of the external environment is relatively low. A non-transparent nameplate C located in the transparent area B shields a part of the light beam to present an anti-black pattern, thereby highlighting an outline of the non-transparent nameplate C.

Compared with a traditional technology, the electronic devices 100, 200, 300 provided in the disclosure cover the printed pattern layers 160, 260, 360 on the housing 120 directly to present luminous patterns. In this way, costs of metal stamping and nameplate electroplating in a traditional manufacturing process are eliminated, and a thickness of the housing is reduced and a weight of the housing is reduced.

The above is merely preferred embodiments of the disclosure, and do not impose any limitation on the disclosure. Any form of change such as an equivalent replacement or modification made by any person skilled in the art to technical means and technical content provided in the disclosure without departing from scope of the technical means of the disclosure is content that does not deviate from the technical means of the disclosure, and still falls within protection scope of disclosure.

What is claimed is:

1. An electronic device, comprising:
a housing, comprising an inner side and an outer side;
a light source disposed on the inner side;
a printed pattern layer covering the outer side, the printed pattern layer comprising a shielding area and a transparent area; and
a non-transparent nameplate, located in the transparent area;
wherein, a light beam from the light source transmits outward through the transparent area,
wherein the printed pattern layer covers the outer side of the housing,
wherein the printed pattern layer comprises a first in-mold rolling pattern film and a second in-mold rolling pattern film, and the first in-mold rolling pattern film is located outside the second in-mold rolling pattern film,
wherein the first in-mold rolling pattern film comprises a first pattern area and a first blank area, and the second in-mold rolling pattern film comprises a second pattern area and a second blank area,
wherein the first pattern area is a non-transparent pattern and corresponds to the shielding area, and the second pattern area is a transparent pattern and corresponds to the transparent area, and
wherein the second pattern area covers a portion of the transparent area to define a low transparent portion and a high transparent portion in the transparent area.

2. The electronic device according to claim 1, wherein the electronic device is a plane display, and the light source is a backlight module.

3. The electronic device according to claim 1, wherein the printed pattern layer comprises a first in-mold rolling (IMR) pattern film.

4. The electronic device according to claim 1, wherein the second pattern area corresponds to a position of the first blank area.

5. The electronic device according to claim 1, wherein a color of the transparent area is different from a color of the housing.

6. The electronic device according to claim 1, further comprising a display panel, the display panel and the printed pattern layer are located on opposite sides of the light source.

7. The electronic device according to claim 1, wherein the housing is a plastic housing.

8. The electronic device according to claim 1, wherein the electronic device is a notebook computer.

* * * * *